United States Patent
Kulkarni

(10) Patent No.: US 12,135,964 B2
(45) Date of Patent: Nov. 5, 2024

(54) SOFTWARE UPDATES WITHOUT DOWNTIME VIA AN INTEGRATION CONTENT MAPPER FOR INTEGRATION SERVICES

(71) Applicant: SAP SE, Walldorf (DE)

(72) Inventor: Gopalkrishna Kulkarni, Bangalore (IN)

(73) Assignee: SAP SE, Walldorf (DE)

( * ) Notice: Subject to any disclaimer, the term of this patent is extended or adjusted under 35 U.S.C. 154(b) by 229 days.

(21) Appl. No.: 17/837,252

(22) Filed: Jun. 10, 2022

(65) Prior Publication Data

US 2023/0401053 A1    Dec. 14, 2023

(51) Int. Cl.
    *G06F 8/656*      (2018.01)
    *G06F 8/61*      (2018.01)
    *G06F 11/36*      (2006.01)

(52) U.S. Cl.
    CPC ............... *G06F 8/656* (2018.02); *G06F 8/61* (2013.01); *G06F 11/3688* (2013.01); *G06F 11/3692* (2013.01)

(58) Field of Classification Search
    CPC ........ G06F 8/656; G06F 8/61; G06F 11/3688; G06F 11/3692
    See application file for complete search history.

(56) References Cited

U.S. PATENT DOCUMENTS

| | | | |
|---|---|---|---|
| 6,119,130 A * | 9/2000 | Nguyen | G06F 16/213 707/999.203 |
| 9,514,205 B1 * | 12/2016 | Yazicioglu | G06F 16/258 |
| 10,776,254 B1 * | 9/2020 | Dhayanithi | G06Q 30/0201 |
| 11,372,828 B1 * | 6/2022 | Bendapudi | G06F 16/258 |

(Continued)

OTHER PUBLICATIONS

Hai, Henry, and Seitaro Sakoda. "SaaS and integration best practices." Fujitsu Scientific and Technical Journal 45.3 (2009): 257-264. (Year: 2009).*

(Continued)

*Primary Examiner* — Kevin L Young
*Assistant Examiner* — Joanne G MacAsiano
(74) *Attorney, Agent, or Firm* — Buckley, Maschoff & Talwalkar LLC

(57) ABSTRACT

A tenant data store contains information associated with tenants of a cloud computing environment, including an indication that a first customer subscribed to an exclusive tenant that receives an upcoming version of runtime software. A notification system pushes a notification about the upcoming runtime to an integration service for the first customer. A tenant preview service may contain the upcoming version of runtime software, and a software update store may contain new integration scenario content (created and tested by the first customer) in connection with the upcoming version of runtime software. An integration content mapper determines, based on old and new integration scenario content metadata, if an automatic port of the new integration scenario content in the software update store should be automatically provided to a runtime node. If it should be automatically provided, the integration content mapper may use a software update tool to automatically deploy the new integration scenario content.

9 Claims, 11 Drawing Sheets

(56) References Cited

U.S. PATENT DOCUMENTS

| | | | |
|---|---|---|---|
| 2015/0095880 A1* | 4/2015 | Lee | G06F 8/30 |
| | | | 717/108 |
| 2015/0172367 A1* | 6/2015 | Said | H04L 67/306 |
| | | | 709/204 |
| 2018/0173477 A1* | 6/2018 | Porwal | G06F 3/1287 |
| 2019/0171437 A1* | 6/2019 | Guda | G06F 8/71 |
| 2020/0358876 A1* | 11/2020 | Kulkarni | G06F 9/5072 |
| 2022/0326930 A1* | 10/2022 | Nandavar | H04L 67/1097 |

OTHER PUBLICATIONS

Tsai, Wei-Tek, and Peide Zhong. "Multi-tenancy and sub-tenancy architecture in software-as-a-service (saas)." 2014 IEEE 8th International Symposium on Service Oriented System Engineering. IEEE, 2014. (Year: 2014).*

* cited by examiner

| TENANT IDENTIFIER 1002 | CUSTOMER 1004 | SUBSCRIBED TO PREVIEW TENANT 1006 | INTEGRATION SCENARIO CONTENT 1008 | TENANT PREVIEW SERVICE IDENTIFIER 1010 |
|---|---|---|---|---|
| T_101 | C_101 | NO | ISC_101 | NONE |
| T_102 | C_102, C_123 | YES | ISC_102 | TPS_102 |
| T_103 | C_103 | YES | ISC_103 | TPS_103 |
| T_104 | C_104 | NO | ISC_104, ISC_105 | NONE |

*FIG. 10*

SOFTWARE UPDATES WITHOUT DOWNTIME VIA AN INTEGRATION CONTENT MAPPER FOR INTEGRATION SERVICES

BACKGROUND

An enterprise may utilize a cloud computing environment to let users perform tasks. For example, the enterprise might let various users execute an application via the cloud computing environment to process purchase orders, adjust human resources information, generate invoices, etc. In some cases, the cloud computing environment will support multiple tenants and onboard Software as a Service ("SaaS") applications using multiple microservices (e.g., one microservice might be associated with a user interface while another microservice handles database resources). Moreover, a Cloud Platform Integration ("CPI") may act as middleware for applications or systems in integration scenarios. As used herein, the phrases "integration scenario" and "integration service" (also referred to as a flow, integration flow, or integration process) may orchestrate complex computer-implemented processes across multiple computing nodes (e.g., systems) and may utilize a large number of data sources using different data access and/or transport protocols or formats. An integration scenario or service can take various forms such as a self-contained file or simply code (e.g., XML, etc.) and may provide requirements and interfaces/APIs among various applications and data sources to implement various processes to achieve a desired use case. An integration suite is an integration Platform-as-a-Service ("iPaaS") that lets customers smoothly integrate on-premises and cloud-based applications and processes with tools and prebuilt content.

When an integration scenario is complete, it may be built and deployed to consumers (tenants of the appropriate account in the cloud platform) who can subscribe to the application through a marketplace user interface (e.g., showing tiles of available application). Note that an integration service is a technical product. A consumer (e.g., a customer) of the service may create, deploy, and/or manage the integration scenarios (e.g., integration contents). A single instance of the application may be offered to multiple customers using a multi-tenancy concept. An integration service may be used to design different integration scenarios using Enterprise Integration Patterns ("EIPs"). The EIPs might be associated with, for example, messaging systems, messaging channels, message construction, message routing, message transformation, message endpoints, system management, etc. For example, FIG. 1 is an example of a system 100 in which a user 110 may define integration service content 130 to be deployed in a production runtime 140. For any integration service, a User Interface ("UI") 120 may support a no-code or low-code way of developing integration service content 130. In services such as SAP® Cloud Integration, there are various types of integration service content 130 such as an integration scenario, a custom adapter, a mapping step, a script step, etc. Once these contents are built, they continue to work in the production runtime 140. The integration service production runtime 140 may provide backward compatibility for new runtime upgrades to support business continuity for customer-built content. However, after some updates to the production runtime 140, certain integration service content 130 (e.g., a custom adapter where a particular coding language is used) might not be supported by the newer production runtime 140. This type of new production runtime 140 software update may therefore halt business continuity. As a result, customers might avoid upgrading immediately (blocking the software update for the customer tenants). This can result in considerable downtime after a software update, especially when a substantial number of service updates, tenants, and/or applications are involved.

It would therefore be desirable to automatically port updated content to an upcoming version of runtime software without downtime for a multi-tenant cloud computing environment in a secure, automatic, and efficient manner.

SUMMARY

According to some embodiments, methods and systems may be associated with a cloud computing environment. A tenant data store contains information associated with tenants of a cloud computing environment, including an indication that a first customer subscribed to an exclusive tenant that receives an upcoming version of runtime software. A notification system pushes a notification about the upcoming runtime to an integration service for the first customer. A tenant preview service may contain the upcoming version of runtime software, and a software update store may contain new integration scenario content (created and tested by the first customer) in connection with the upcoming version of runtime software. An integration content mapper determines, based on old and new integration scenario content metadata, if an automatic port of the new integration scenario content in the software update store should be automatically provided to a runtime node. If it should be automatically provided, the integration content mapper may use a software update tool to automatically deploy the new integration scenario content.

Some embodiments comprise: means for accessing, by a notification system, a tenant data store containing information associated with tenants of a cloud computing environment, including an indication that a first customer has subscribed to an exclusive tenant that receives an upcoming version of runtime software; means for pushing, by the notification system, a notification about the upcoming version of runtime software to an integration service for the first customer; means for establishing, in a tenant preview service for the exclusive tenant, the upcoming version of runtime software; means for establishing, in a software update store, new integration scenario content, created and tested by the first customer, in connection with the upcoming version of runtime software; means for determining, by a computer processor of an integration content mapper based on old and new integration scenario content metadata, if an automatic port of the new integration scenario content in the software update store should be automatically provided to a runtime node; and, if the new integration scenario content should be automatically provided, means for using, by the computer processor of the integration content mapper, a software update tool to automatically deploy the new integration scenario content. If the new integration scenario content should not be automatically provided, means for using, by the computer processor of the integration content mapper, a software update tool to automatically deploy old integration scenario content.

Some technical advantages of some embodiments disclosed herein are improved systems and methods to automatically port updated content to an upcoming version of runtime software without downtime for a multi-tenant cloud computing environment in a secure, automatic, and efficient manner. According to some embodiments, a customer gets a tenant preview, tests an adapter, provides an updated (fixed)

adapter, and that adapter may be automatically ported during the upgrade to the new updated tenant.

BRIEF DESCRIPTION OF THE DRAWINGS

FIG. 10 is portion of a tenant data store in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
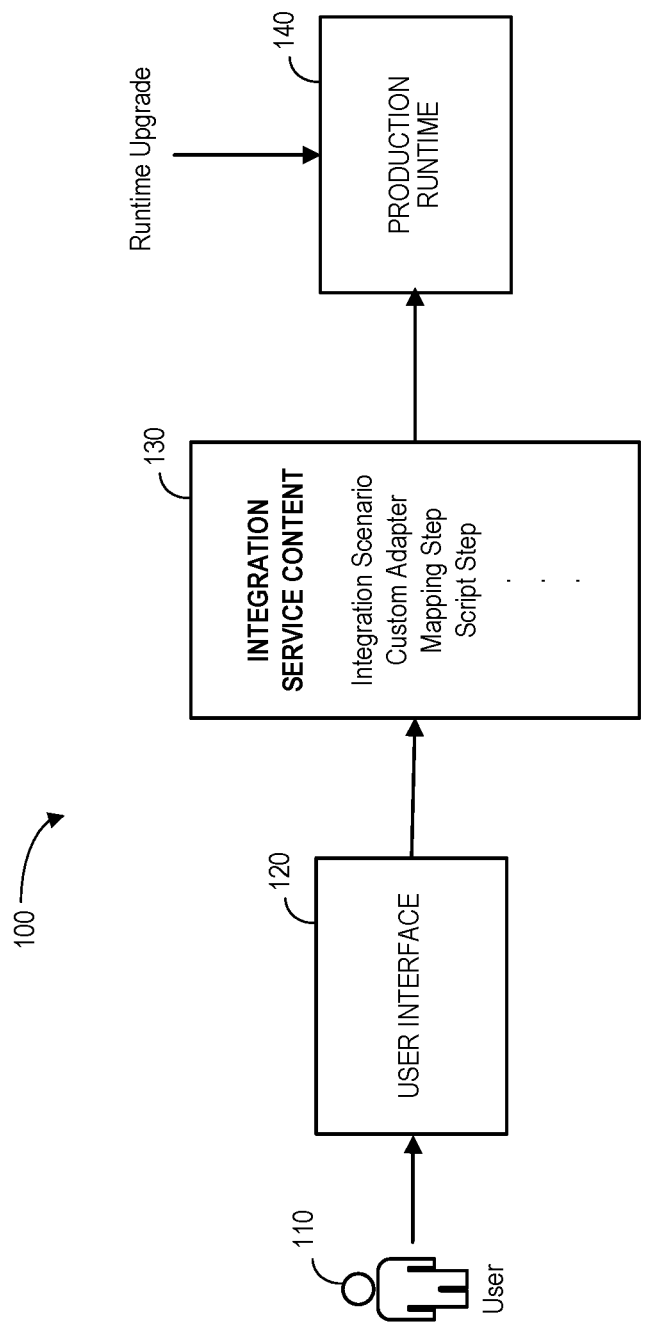
FIG. 1 is an example of a system in which a user may define integration service content to be deployed in a production runtime.
Figure 2:
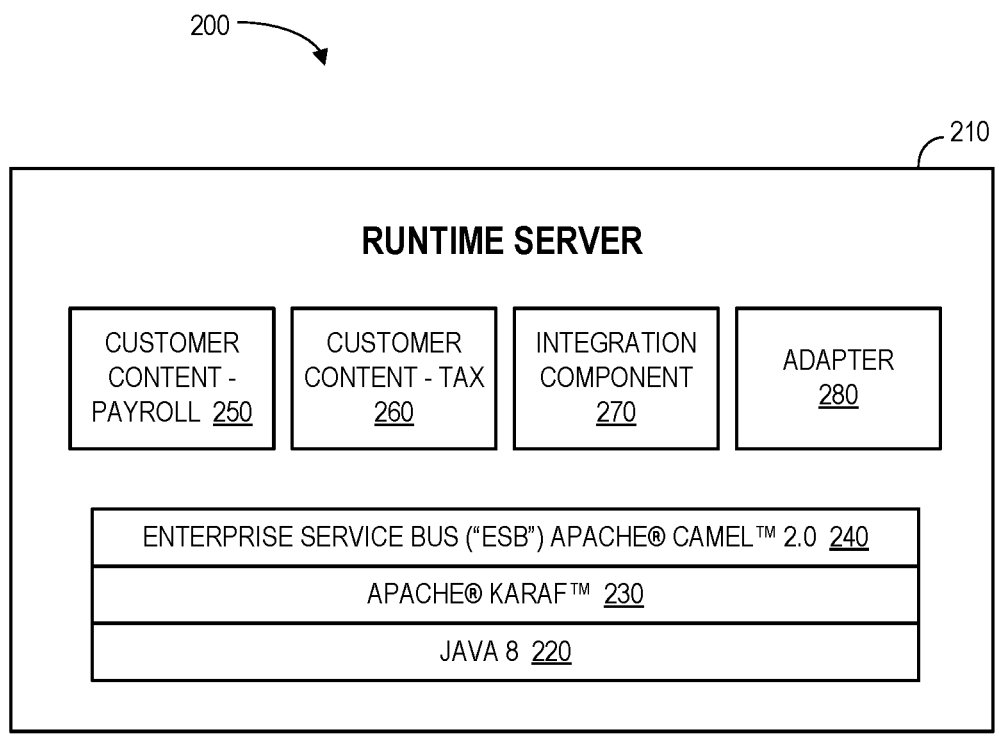
FIG. 2 is a runtime system before a runtime upgrade.
Figure 3:
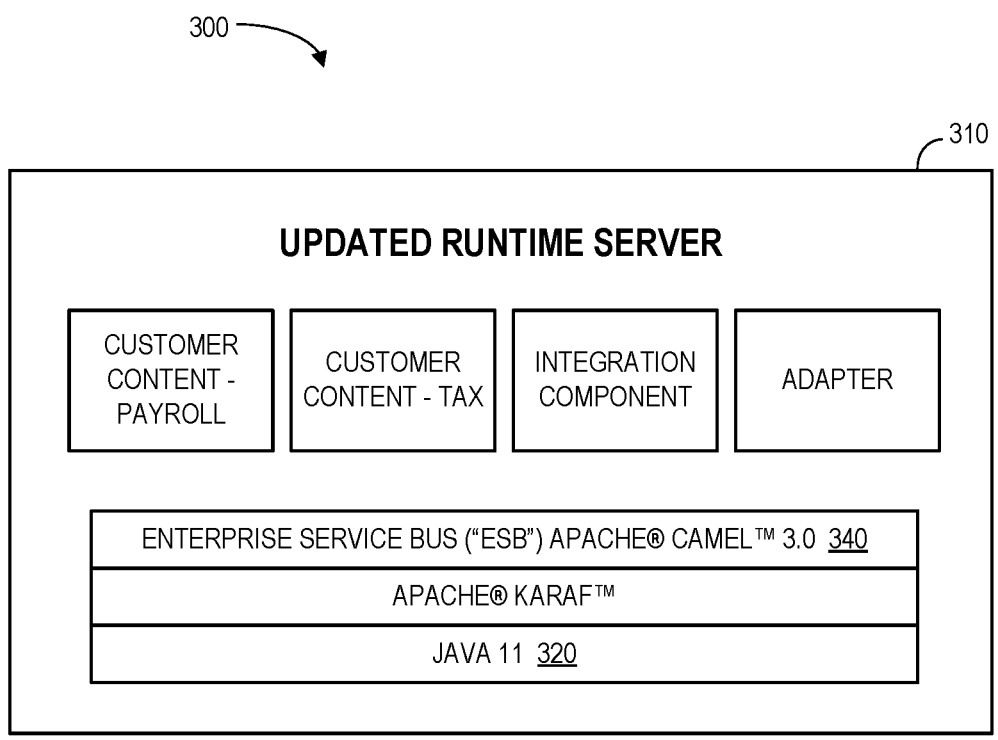
FIG. 3 is a runtime system after a runtime upgrade.

When an integration service, such as SAP® Cloud Integration, decides to upgrade the runtime of the service to a newer software version, the latest runtime might not support customer-built integration content "out-of-the-box." For example, FIG. 2 is a runtime system 200 before a runtime upgrade. The system 200 includes a runtime server 210 executing a Java 8 development platform 220, an APACHE® KARAF™ development platform runtime 230, and an APACHE® CAMEL™ 2.0 Enterprise Service Bus ("ESB") 240 to support customer content (e.g., payroll customer content 250, tax customer content 260, integration components 270, adapters 280, etc.). FIG. 3 is a runtime system 300 after a runtime upgrade in which an update runtime server 310 now utilizes a Java 11 development platform 320 and an APACHE® CAMEL™ 3.0 ESB 340. In this case, the customer might need to build new content that can work with the upcoming updated runtime server 310. This can introduce several problems:

How can the customer know whether the content will work in the updated runtime server 310?

If the customer builds new content which works with the updated runtime server 310 (and does not work with the current version 210), how should this content be ported to upcoming version without downtime?

How to communicate to the content creator about the new upcoming version (and the follow-up activities they might want to perform)?

When a content creator has many consumers (e.g., partner content of SAP® Cloud Integration) and multiple tenants use the same content, how can these tenants be conveniently updated?

Without solving these problems, moving to the updated runtime server 310 for the integration service will be blocked. Customers expect to not have downtime and integration service Total Cost of Ownership "TCO") management may require a self-service way for customer to solve these problems.

Some embodiments described herein establish a software framework to communicate information about upcoming (and possibly incompatible) runtime changes to the integration content developer. For example, the system might provide a notification in product documentation and news and announcements, direct communications to customers using the integration service, a notification banner in an integration service UI, etc. Moreover, embodiments may provide a self-service way to procure a preview sample tenant with upcoming runtime (which the customer can use test the content and build new content if required). A customer with valid entitlements may subscribe to this preview system as a tenant. In some embodiments, this preview system has limited resources and may expire after a certain period of time (e.g., to reduce costs).

According to some embodiments, the entire tenant may be previewed (e.g., a fully working tenant which has limited support and lifetime) and may contain the upcoming version of the runtime software. In some embodiments, the store does not interact with this tenant, but instead the store is part of the current tenant customer is using. The store facilitates an upload of content specific to the software of the tenant preview. The mapper provides a way to understand if there is an adapter in the productive tenant (e.g., the current tenant) which maps to the adapter in the store using metadata. If so, then the software update module picks the adapter from store instead of from the current tenant.

When the integration content developer builds new content to support the upcoming runtime, embodiments may also provide a way to port the content to the tenant with little or no downtime. Embodiments may offer a new multi-tenant service (e.g., a module or a microservice depending on the underline architecture) to support integration content updates with a UI to upload the content.

Figure 4:
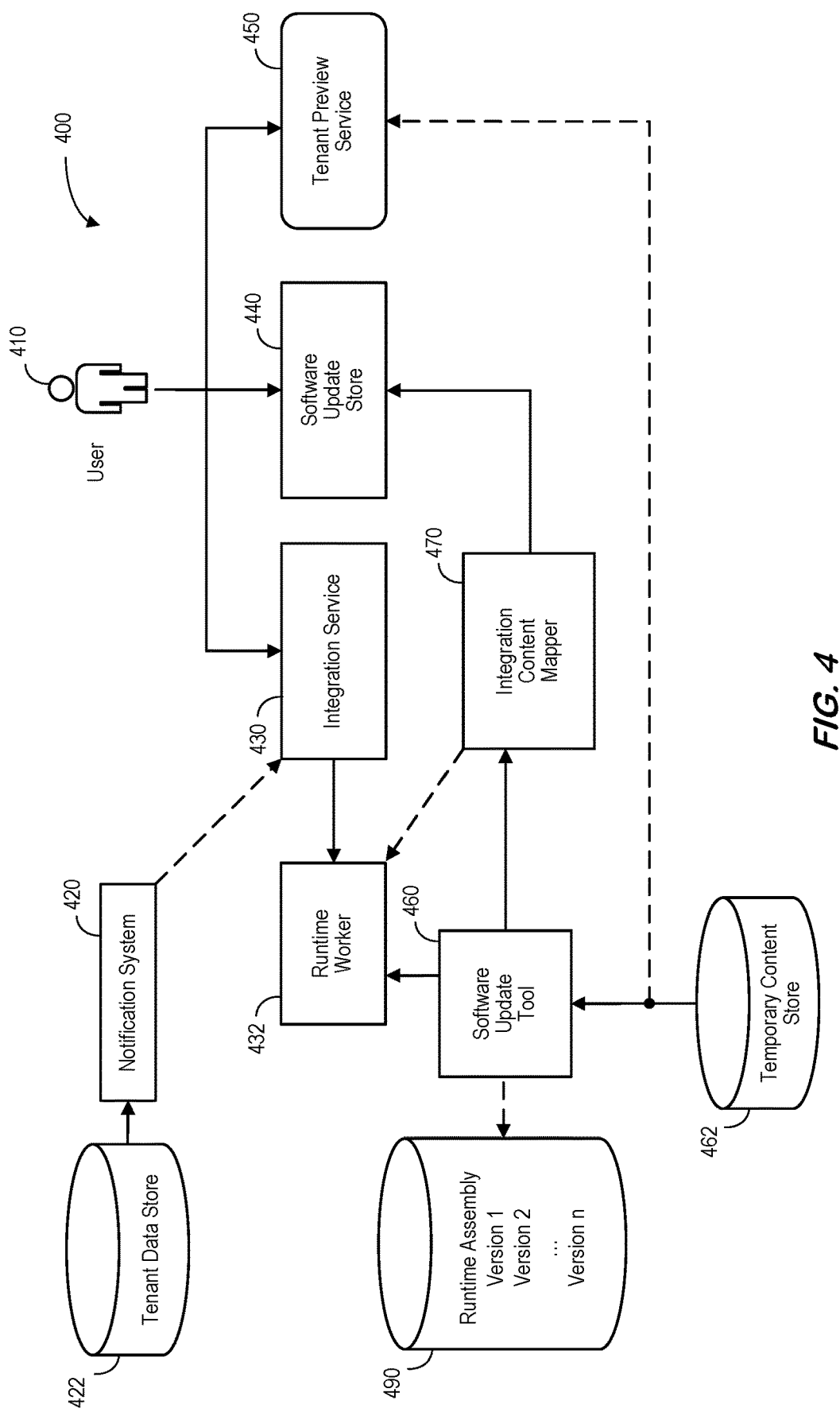
FIG. 4 is a high-level block diagram of a system architecture in accordance with some embodiments.

FIG. 4 is a high-level block diagram of a system 400 architecture in accordance with some embodiments. The system 400 includes a notification system 420 that accesses a tenant data store 422 (e.g., containing information associated with tenants of a cloud computing environment, including indications if customers have subscribed to an exclusive tenant that receives an upcoming version of runtime software) to determine if a customer is interested in new production runtime software. If so, a notification may be displayed to a user 410 via an integration service 430 (e.g., by pushing a notification about the upcoming version of runtime software). The user 410 may also access a software update store 440 (e.g., containing new integration scenario content, created and tested by the first customer, in connection with the upcoming version of runtime software) and a tenant preview service 450 (e.g., for the exclusive tenant and containing the upcoming version of runtime software).

An integration content mapper 470 may determine, based on old and new integration scenario content metadata, if an automatic port of the new integration scenario content in the software update store 440 should be automatically provided to a runtime worker 432. If the new integration scenario content should be automatically provided, a software update tool 460 and temporary content store 462 may automatically deploy the new integration scenario content and versions may be stored in a runtime assembly database 490.

As used herein, devices, including those associated with the system 400 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The tenant preview service 450 and software update tool 460 may store information into and/or retrieve information from various data stores, which may be locally stored or reside remote from the tenant preview service 450 and software update tool 460. Although a single integration content mapper 470 is shown in FIG. 4, any number of such devices may be included. Moreover, various devices described herein might be combined according to embodiments of the present invention. For example, in some embodiments, the software update tool 460 and integration content mapper 470 might comprise a single apparatus. Any of the system 400 functions may be performed by a constellation of networked apparatuses, such as in a distributed processing or cloud-based architecture.

A user or administrator may access the system 400 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to define early tenant preview subscription requirements) and/or provide or receive automatically generated recommendations, reports, alerts, or results from the system 400. In some cases, a cloud platform integration may be built using a microservice architecture (e.g., the integration content mapper 470 might be associated with CLOUD FOUNDRY®).

Figure 5:
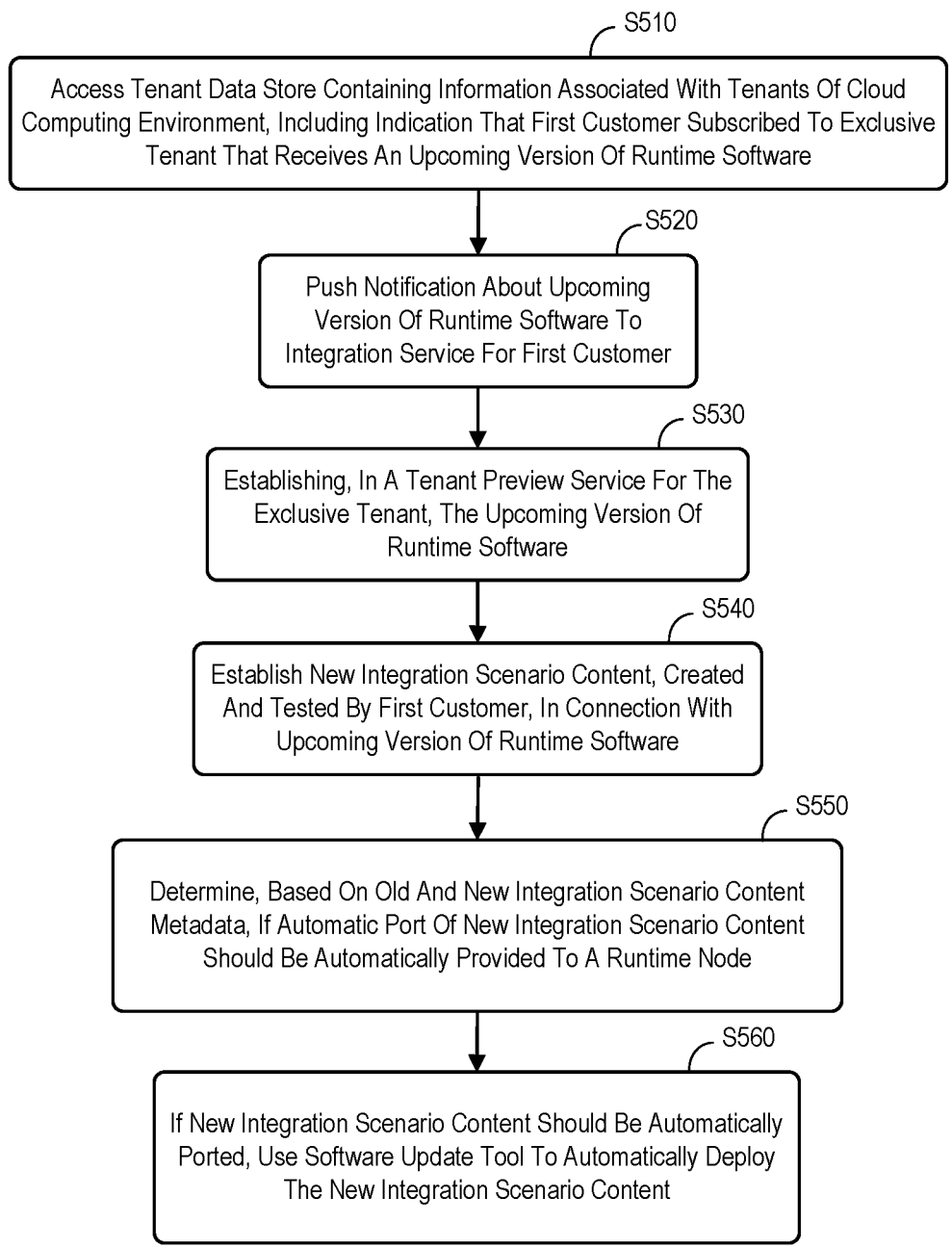
FIG. 5 is a method according to some embodiments.

FIG. 5 is a method that might performed by some or all of the elements of the system 400 described with respect to FIG. 4. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S510, a notification system may access a tenant data store containing information associated with tenants of the cloud computing environment (including an indication that a first customer has subscribed to an exclusive tenant that receives an upcoming version of runtime software). At S520, the notification system may push a notification about the upcoming version of runtime software to an integration service for the first customer.

At S530, the upcoming version of runtime software may be established in a tenant preview service. At S540, new integration scenario content (created and tested by the first customer) may be established in a software update store for the upcoming version of runtime software. The new integration scenario content might be associated with, for example, an integration scenario, a custom adapter, a mapping step, a script step, integration components, etc.

At S550, a computer processor of an integration content mapper may determine (based on old and new integration scenario content metadata) if an automatic port of the new integration scenario content in the software update store should be automatically provided to a runtime node. If the new integration scenario content should be automatically provided, the integration content mapper may use a software update tool to automatically deploy the new integration scenario content at S560. If the new integration scenario content should not be automatically provided, the integration content mapper may use the software update tool to automatically deploy old integration scenario content. According to some embodiments, an Application Programming Interface ("API") may upload new integration scenario content to the software update store in connection with a plurality of customers or tenants.

Figure 6:
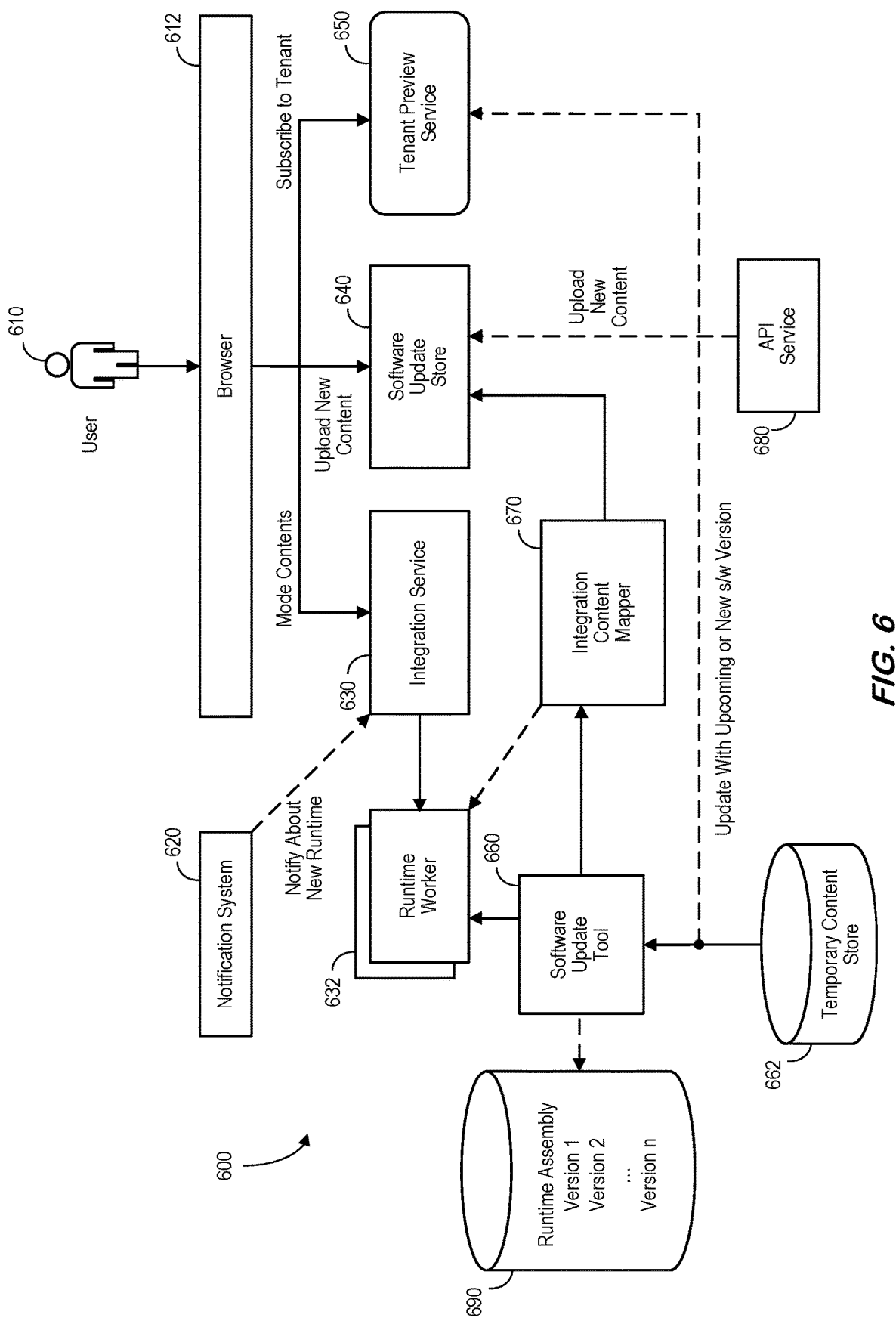
FIG. 6 is a more detailed block diagram of a system architecture in accordance with some embodiments.

FIG. 6 is a more detailed integration service system 600 in accordance with some embodiments. As before, the system 600 includes a notification system 620 to determine if a customer is interested in new production runtime software. If so, a notification may be displayed to a user 610 via an integration service 630 (e.g., by pushing a notification about the upcoming version of runtime software). In this way, the notification system 620 may act as a service that simply pushes notifications about a new software update to the integration service 630 (so that an integration developer can be aware of the changes and take any necessary actions).

The user 610 may also access a software update store 640 (e.g., containing new integration scenario content, created and tested by the first customer, in connection with the upcoming version of runtime software) and a tenant preview service 650 (e.g., for the exclusive tenant and containing the upcoming version of runtime software). That is, after a user gets the specialized tenant, he or she can test and create new content as necessary. This new content (which will work with the upcoming runtime worker 632 software) then will be published to the software update store. The tenant preview service 650 offers a specialized tenant subscription which contains an upcoming version of runtime software. The service may be optimized for cost and contain only necessary components to carry out the testing (and may auto terminate after a specified time to reduce the expense).

An integration content mapper 670 may determine, based on old and new integration scenario content metadata, if an automatic port of the new integration scenario content in the software update store 640 should be automatically provided to a runtime worker 632. If the new integration scenario content should be automatically provided, a software update tool 660 and temporary content store 662 may automatically deploy the new integration scenario content and versions may be stored in a runtime assembly database 690. The integration content mapper 670 may, according to some embodiments, use old content and new content metadata to understand if auto-porting to the runtime worker 632 node is appropriate. The software update tool 660 will use it as a helper module and auto port the new content to the runtime worker 632 node being updated (i.e., old content will not be deployed by the software update tool 660 if a match is found and instead the new content will be deployed).

In this way, embodiments may provide a distributed software framework to support communication with content creators about upcoming software changes. The customer (content creator) may subscribe to an exclusive tenant with the upcoming runtime and the software update store 640 may upload the new content which works with upcoming version. The software update tool 660 and integration content mapper 670 has the intelligence to compare the old content and new content and automatically upload the new content during the runtime worker 632 software update without the downtime. For example, the integration content mapper 670 may determine fold content and new content metadata to determine if an automated porting to the runtime worker 632 that is being updated. The software update tool 660 may use it as a helper module and automatically port new content on the runtime node being updated (and old content will not be deployed by the software update tool 660 for the new runtime). A convenience API service 680 may upload content used by more than one tenant (e.g., partner content) to the software update store 640 for these tenants. This service provides an API abstraction to upload partner content directly to the affected tenants (saving re-work for customers).

Figure 7:
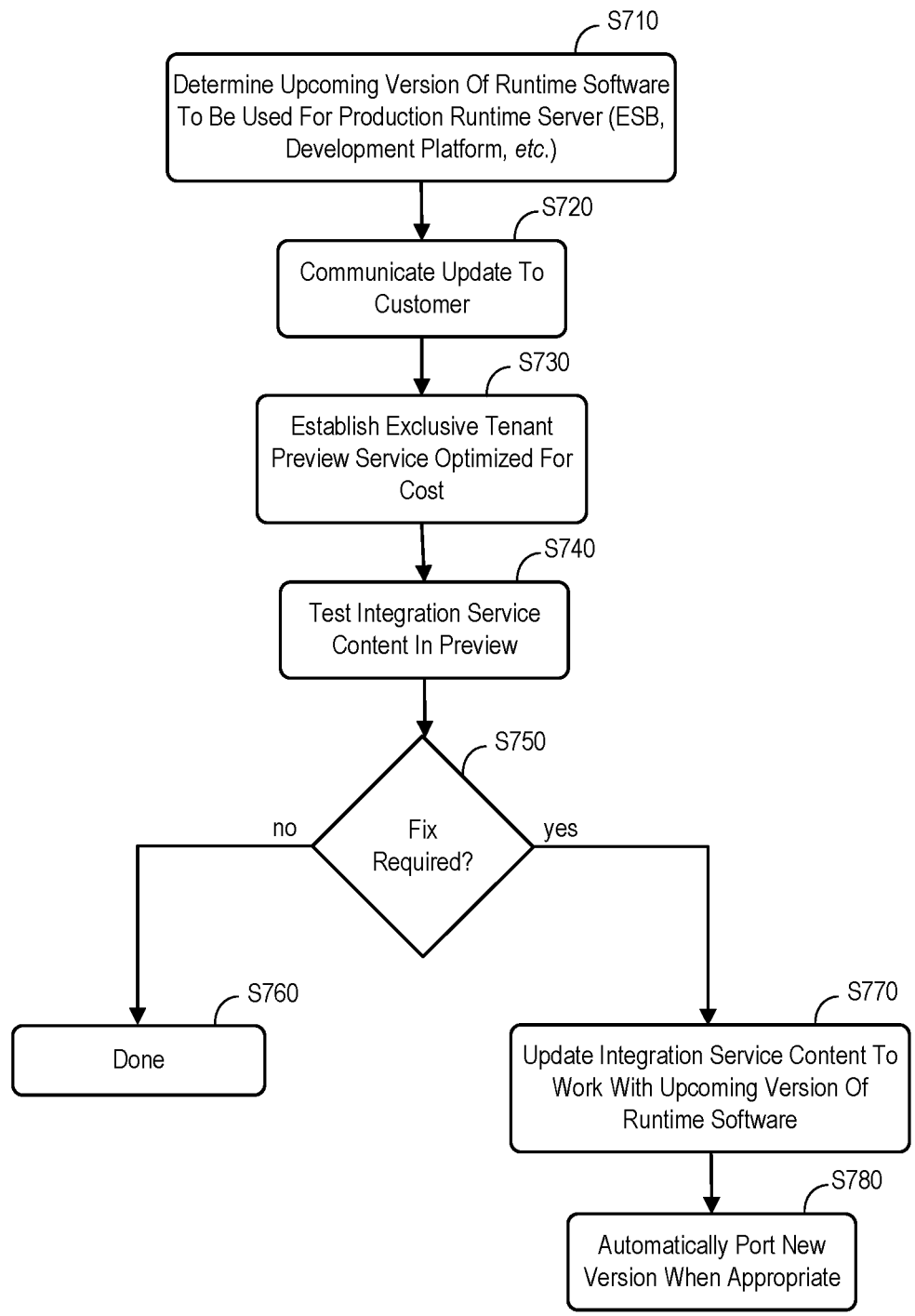
FIG. 7 is a method according to some embodiments.

FIG. 7 is a more detailed method according to some embodiments. At S710, an upcoming version of runtime software to be used for a production runtime server is determined. The software might be associated with, for example, an ESB, a development platform, etc. At S720, information about the update is communicated to a customer (e.g., so they can take the steps necessary to prepare for the upcoming changes). At S730, an exclusive preview, optimized for cost, is established to run the upcoming version of runtime software for testing. The customer can test the integration service content in the preview at S750. If no fix is required at S750, the method is done at S760. If a fix is required at S750, the integration service content is updated at S770 to work with the upcoming version of runtime software. The new version can then be automatically provided at S780 when appropriate.

Figure 8:
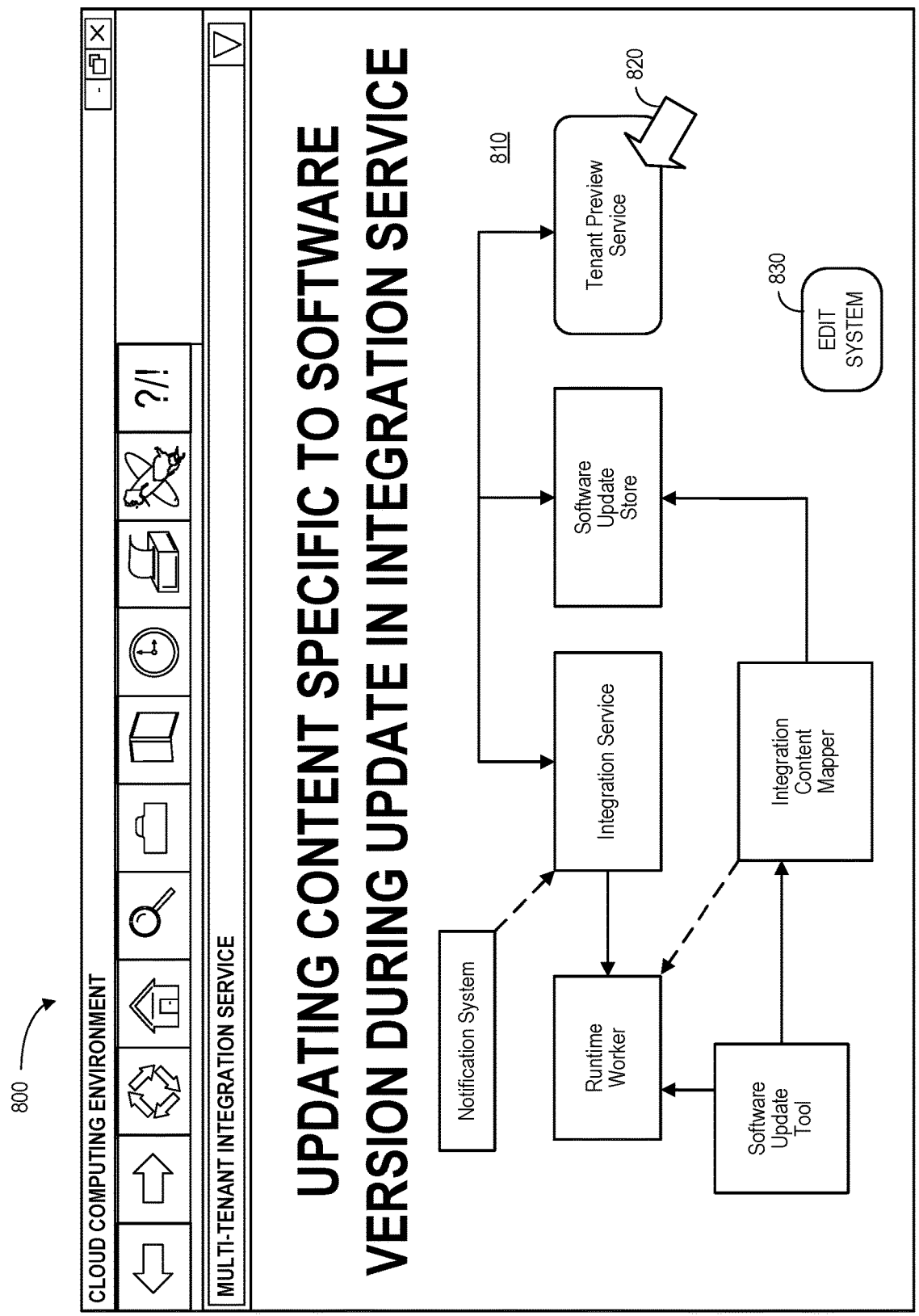
FIG. 8 is a human machine interface display according to some embodiments.

FIG. 8 is a human machine interface display 800 in accordance with some embodiments. The display 800 includes a graphical representation 810 of a software update system in accordance with any of the embodiments described herein. Selection of an element on the display 800 (e.g., via a touchscreen or a computer pointer 820) may result in display of a pop-up window containing more detailed information about that element and/or various options (e.g., to add a microservice, subscribe to tenant preview, etc.). Selection of an "Edit System" icon 830 may also let an operator or administrator adjust the operation of the software update system.

Figure 9:
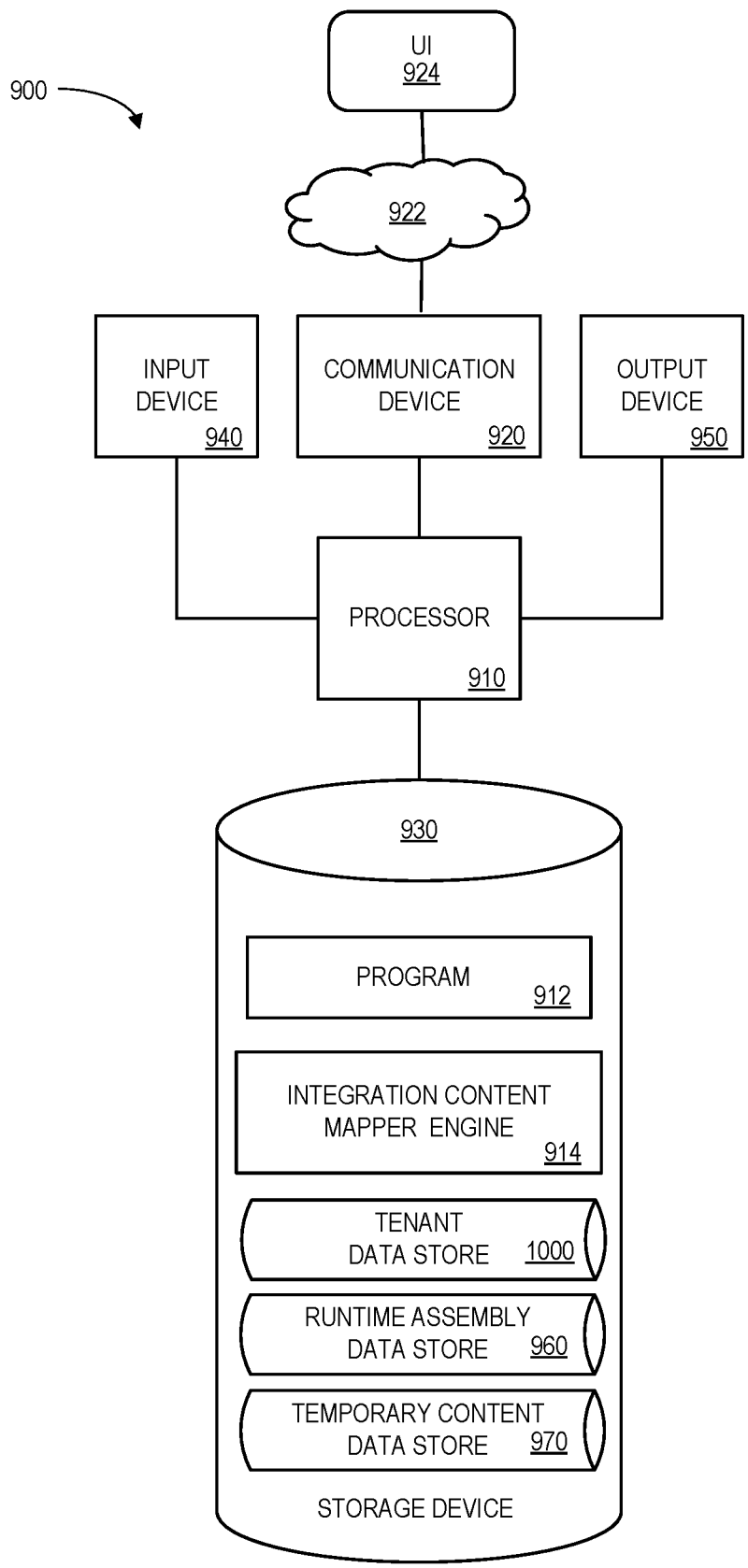
FIG. 9 is an apparatus or platform according to some embodiments.

Note that the embodiments described herein may be implemented using any number of different hardware configurations. For example, FIG. 9 is a block diagram of an apparatus or platform 900 that may be, for example, associated with the systems 400, 600 of FIGS. 4 and 6, respectively (and/or any other system described herein). The platform 900 comprises a processor 910, such as one or more commercially available Central Processing Units ("CPUs") in the form of one-chip microprocessors, coupled to a communication device 920 configured to communicate via a communication network (not shown in FIG. 9). The communication device 920 may be used to communicate, for example, with one or more remote user interfaces 924 via a communication network 922. The platform 900 further includes an input device 940 (e.g., a computer mouse and/or keyboard to input microservice and integration service information) and/an output device 950 (e.g., a computer monitor to render a display, transmit recommendations or alerts, and/or create reports about integration services, tenants, subscriptions, runtime updates, etc.). According to some embodiments, a mobile device or PC may be used to exchange information with the platform 900.

The processor 910 also communicates with a storage device 930. The storage device 930 may comprise any appropriate information storage device, including combinations of magnetic storage devices (e.g., a hard disk drive), optical storage devices, mobile telephones, and/or semiconductor memory devices. The storage device 930 stores a program 912 and/or an integration content mapper engine 914 for controlling the processor 910. The processor 910 performs instructions of the programs 912, 914, and thereby operates in accordance with any of the embodiments described herein. For example, the processor 910 may access a tenant data store 1000 that contains information associated with tenants of a cloud computing environment, including an indication that a first customer subscribed to an exclusive tenant that receives an upcoming version of runtime software. The processor 910 may push a notification about the upcoming runtime to an integration service for the first customer. A tenant preview service may contain the upcoming version of runtime software, and a software update store may contain new integration scenario content (created and tested by the first customer) in connection with the upcoming version of runtime software. The processor 910 may also determine, based on old and new integration scenario content metadata, if an automatic port of the new integration scenario content in the software update store should be automatically provided to a runtime node. If it should be automatically provided, the processor 910 may use a software update tool to automatically deploy the new integration scenario content.

The programs 912, 914 may be stored in a compressed, uncompiled and/or encrypted format. The programs 912, 914 may furthermore include other program elements, such as an operating system, clipboard application, a database management system, and/or device drivers used by the processor 910 to interface with peripheral devices.

As used herein, information may be "received" by or "transmitted" to, for example: (i) the platform 900 from another device; or (ii) a software application or module within the platform 900 from another software application, module, or any other source.

In some embodiments (such as the one shown in FIG. 9), the storage device 930 stores the tenant data store 1000, a runtime assembly data store 960 (e.g., supporting a software update tool), a temporary content data store 970 (e.g., supporting a software update tool and a tenant preview service), etc. An example of a database that may be used in connection with the platform 900 will now be described in detail with respect to FIG. 10. Note that the database described herein is only one example, and additional and/or different information may be stored therein. Moreover, various databases might be split or combined in accordance with any of the embodiments described herein.

Referring to FIG. 10, a table is shown that represents the tenant data store 1000 that may be stored at the platform 900 according to some embodiments. The table may include, for example, entries associated with tenants of a cloud computing environment. The table may also define fields 1002, 1004, 1006, 1008, 1010 for each of the entries. The fields 1002, 1004, 1006, 1008, 1010 may, according to some embodiments, specify: a tenant identifier 1002, customer 1004, a subscription to tenant preview indication 1006, integration scenario content 1008, and a tenant preview service identifier 1010. The tenant data store 1000 may be created and updated, for example, when new runtime server updates are deployed, new integration content is created, new tenants are added or updated, etc.

The tenant identifier 1002 might be a unique alphanumeric label that is associated with a specific tenant in a cloud computing environment. The customer 1004 may identify one or more customers associated with the tenant identifier 1002. The subscription to tenant preview indication 1006 might indicate whether or not that tenant/customer is interested in receiving information about upcoming runtime server software updates (so that integration content can be tested in advance of the update). The integration scenario content 1008 might indicate, for example, metadata about custom adapters, mapping steps, scripting steps, etc. The tenant preview service identifier 1010 may identify an exclusive tenant preview that can be used to run the runtime server software updates to test the integration scenario content 1008.

Figure 11:
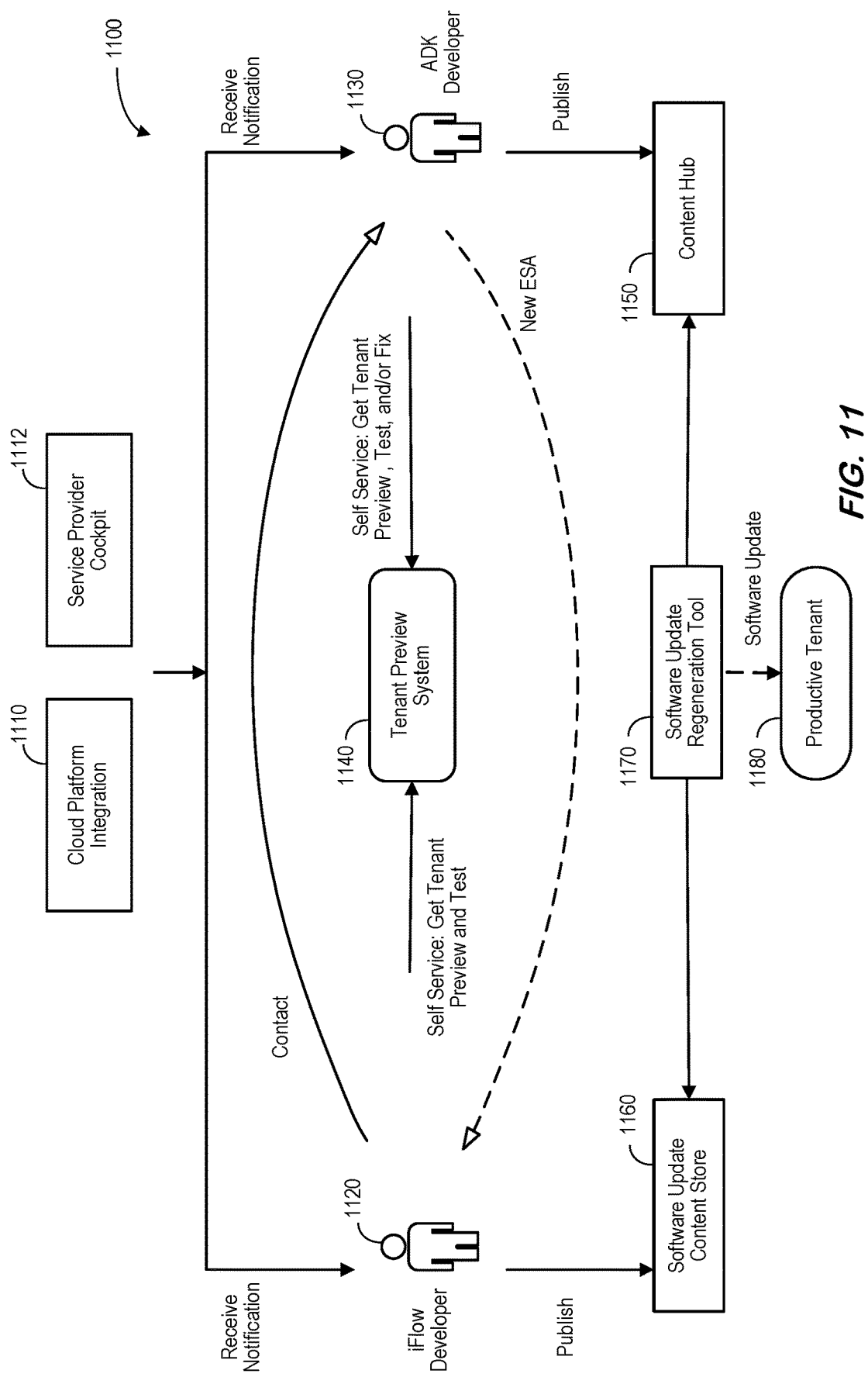
FIG. 11 is an example implementation according to some embodiments.

FIG. 11 is an example 1100 implementation according to some embodiments. A cloud platform integration 1110 and/or a service provider cockpit 1112 may be used to provide notifications about upcoming changes to an iFlow developer 1120 and/or an Application Developer Kit ("ADK") developer 1130. The iFlow developer 1120 may contact the ADK developer 1130 who may perform some testing in a tenant preview system 1140 and send a new ESA file (for updated integration scenario content) to the iFlow developer 1120. The iFlow developer 1120 may also perform testing in the tenant preview system 1140. For example, if an adapter fix is needed in such a way that it only works with APACHE® CAMEL™ 3.x, the iFlow developer 1120 will get a notification about an upcoming major release via the cloud platform integration 1110. The iFlow developer 1120 is also able get a tenant preview system 1140 which has the 3.x runtime installed. The iFlow developer 1120 may publish to a software update content store 1160, and the ADK developer may publish to a content hub 1150. A software update regeneration tool 1170 can then provide the software update to a productive tenant 1180. A partner may publish a new version in the content hub 1150 with additional metadata marking it only for software update, and the software tool 1170 will pick the adapters from content hub 1150 and port them to the consuming tenants.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of integration services and microservices, any of the embodiments described herein could be applied to other types of applications. Moreover, the displays shown herein are provided only as examples, and any other type of user interface could be implemented. Any of the embodiments described herein may provide other types of applications and/or displays.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system associated with a cloud computing environment, comprising:
    a tenant data store containing information associated with tenants of the cloud computing environment, including an indication that a first customer has subscribed to an exclusive tenant that receives an upcoming version of runtime software associated with an Enterprise Service Bus ("ESB");
    a notification system that pushes a notification about the upcoming version of runtime software to an integration service for the first customer;
    a tenant preview service, for the exclusive tenant, containing the upcoming version of runtime software;
    a software update store containing new integration scenario content, created and tested by the first customer, in connection with the upcoming version of runtime software; and
    an integration content mapper, including:
        a computer processor, and
        computer memory, coupled to the computer processor and storing instructions that, when executed by the computer processor, cause the integration content mapper to:
            (i) determine, based on old and new integration scenario content metadata, if an automatic port of the new integration scenario content in the software update store should be automatically provided to a runtime node,
            (ii) if the new integration scenario content should be automatically provided, use a software update tool to automatically deploy the new integration scenario content, via an Application Programming Interface ("API"), for a plurality of customers and tenants, and
            (iii) if the new integration scenario content should not be automatically provided, automatically deploy old integration scenario content to the runtime node.

2. The system of claim 1, wherein the integration content mapper uses the old and new integration scenario content metadata to determine if an adapter exists that maps to an adapter in the software update store and, if so, that adapter is selected from software update store instead of from a current tenant.

3. The system of claim 1, wherein the new integration scenario content is associated with at least one of: (i) an integration scenario, (ii) a custom adapter, (iii) a mapping step, (iv) a script step, and (v) integration components.

4. The system of claim 1, wherein the tenant preview service terminates after a pre-defined period of time.

5. A computer-implemented method associated with a cloud computing environment, comprising:

accessing, by a notification system, a tenant data store containing information associated with tenants of the cloud computing environment, including an indication that a first customer has subscribed to an exclusive tenant that receives an upcoming version of runtime software associated with an Enterprise Service Bus ("ESB");

pushing, by the notification system, a notification about the upcoming version of runtime software to an integration service for the first customer;

establishing, in a tenant preview service for the exclusive tenant, the upcoming version of runtime software;

establishing, in a software update store, new integration scenario content, created and tested by the first customer, in connection with the upcoming version of runtime software;

determining, by a computer processor of an integration content mapper based on old and new integration scenario content metadata, if an automatic port of the new integration scenario content in the software update store should be automatically provided to a runtime node; and if the new integration scenario content should be automatically provided, using, by the computer processor of the integration content mapper, a software update tool and a temporary content store that supports the tenant preview service to automatically deploy the new integration scenario content, via an Application Programming Interface ("API"), for a plurality of customers and tenants, and if the new integration scenario content should not be automatically provided, automatically deploying old integration scenario content to the runtime node.

6. The method of claim 5, wherein the new integration scenario content is associated with at least one of: (i) an integration scenario, (ii) a custom adapter, (iii) a mapping step, (iv) a script step, and (v) integration components.

7. The method of claim 5, wherein the tenant preview service terminates after a pre-defined period of time.

8. A non-transitory, computer-readable medium storing instructions, that, when executed by a processor, cause the processor to perform a method associated with a cloud computing environment, the method comprising:

accessing, by a notification system, a tenant data store containing information associated with tenants of the cloud computing environment, including an indication that a first customer has subscribed to an exclusive tenant that receives an upcoming version of runtime software associated with an Enterprise Service Bus ("ESB");

pushing, by the notification system, a notification about the upcoming version of runtime software to an integration service for the first customer;

establishing, in a tenant preview service for the exclusive tenant, the upcoming version of runtime software;

establishing, in a software update store, new integration scenario content, created and tested by the first customer, in connection with the upcoming version of runtime software;

determining, by a computer processor of an integration content mapper based on old and new integration scenario content metadata, if an automatic port of the new integration scenario content in the software update store should be automatically provided to a runtime node; and if the new integration scenario content should be automatically provided, using, by the computer processor of the integration content mapper, a software update tool to automatically deploy the new integration scenario content, via an Application Programming Interface ("API"), for a plurality of customers and tenants, and if the new integration scenario content should not be automatically provided, automatically deploying old integration scenario content to the runtime node, wherein the tenant preview service terminates after a pre-defined period of time.

9. The medium of claim 8, wherein the new integration scenario content is associated with at least one of: (i) an integration scenario, (ii) a custom adapter, (iii) a mapping step, (iv) a script step, and (v) integration components.

* * * * *